(12) United States Patent
Bhattacharjee et al.

(10) Patent No.: US 8,200,645 B2
(45) Date of Patent: Jun. 12, 2012

(54) SYSTEM AND METHOD FOR EXECUTING MULTIPLE CONCURRENT INDEX-DRIVEN TABLE ACCESS OPERATIONS

(75) Inventors: Bishwaranjan Bhattacharjee, Yorktown Heights, NY (US); Christian A. Lang, New York, NY (US); Timothy R. Malkemus, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/859,405

(22) Filed: Sep. 21, 2007

(65) Prior Publication Data

US 2009/0083212 A1      Mar. 26, 2009

(51) Int. Cl.
G06F 7/00     (2006.01)
G06F 17/00    (2006.01)
G06F 17/30    (2006.01)
(52) U.S. Cl. .................. 707/705; 707/830; 707/704
(58) Field of Classification Search .................. None
See application file for complete search history.

(56) References Cited

U.S. PATENT DOCUMENTS

| | | | |
|---|---|---|---|
| 5,495,608 A * | 2/1996 | Antoshenkov | .................. 1/1 |
| 5,812,996 A | 9/1998 | Rubin et al. | |
| 5,819,255 A * | 10/1998 | Celis et al. | .................. 1/1 |
| 5,822,749 A | 10/1998 | Agarwal | |
| 6,205,441 B1 * | 3/2001 | Al-omari et al. | .................. 1/1 |
| 6,275,818 B1 | 8/2001 | Subramanian et al. | |
| 6,304,866 B1 | 10/2001 | Chow et al. | |
| 6,317,738 B1 | 11/2001 | Lohman et al. | |
| 6,374,232 B1 | 4/2002 | Dageville et al. | |
| 7,630,994 B1 * | 12/2009 | Deshmukh et al. | .................. 1/1 |
| 2005/0187917 A1 | 8/2005 | Lawande et al. | |

OTHER PUBLICATIONS

Harizopoulos, et al., "QPipe: A Simultaneously Pipelined Relational Query Engine," SIGMOD 2005, Jun. 14,16, 2005, Baltimore, Maryland, USA, Copyright 2005, ACM1-59593-060-4/05/06.
Zukowski, et al., "Cooperative Scans: Dynamic Bandwidth Sharing in a DBMS," VLDB '07, Sep. 23, 28, 2007, Vienna, Austria, Copyright 2007 VLDB Endowment, ACM 978-1-59593-649-3/07/09.
Roy, P., et al., "Efficient and Extensible Algorithms for Multi Query Optimization," In Proc. ACM SIGMOD Int. COnf. on Management of Data, pp. 249-260, 2000.
Shim, J., et al., "Dynamic Caching of Query Results for Decision Support Systems," In Proc. Int. Conf. on Scientific and Statistical Database Management, pp. 254-263, 1999.

* cited by examiner

*Primary Examiner* — Pierre Vital
*Assistant Examiner* — Loan T Nguyen
(74) *Attorney, Agent, or Firm* — Jeffrey N. Giunta; Fleit Gibbons Gutman Bongini & Bianco PL

(57) ABSTRACT

An index scan processor and method to perform concurrent scans of stored indexed data. An indexed data scanner performs a first scan of stored data by sequentially scanning through an index data structure and maintains, over a duration of the first scan, a first scan current scan location within the index data structure that indicates a currently accessed record within the stored data structure for the first scan. A scan manager accepts a request for a second scan of the stored data, determines, during the performing the first scan, a starting index scan location within the index data structure for the second scan that is sufficiently near the first scan current index scan location to cause records indicated by the starting location index to be stored within a buffer due to the performing the first scan, and starts the second scan at the starting location and proceeding to the second end key.

20 Claims, 8 Drawing Sheets

SYSTEM AND METHOD FOR EXECUTING MULTIPLE CONCURRENT INDEX-DRIVEN TABLE ACCESS OPERATIONS

CROSS-REFERENCE TO RELATED APPLICATIONS

This application is related to U.S. patent application Ser. No. 11/859,384, entitled "SYSTEM AND METHOD FOR ESTIMATING DISTANCES BETWEEN MULTIPLE INDEX-DRIVEN SCAN OPERATIONS," filed on even date herewith the entire disclosure of which is herein incorporated by reference.

FIELD OF THE INVENTION

The present invention relates generally to systems and methods for accessing database tables and more particularly to scanning index-driven table access operations.

BACKGROUND OF THE INVENTION

Stored data, such as data stored and maintained by a Relational Database Management System (DBMS) are able to have increased flexibility in accessing stored data by maintaining indices into the stored data. An index into a stored dataset often does not allow accessing data according to the order in which the data is stored in the dataset. Performing multiple scanning operations through an index of a dataset therefore requires non-sequential access to the dataset. Determination of future data accesses in an index scan is difficult since the index structure may not be transparent to application programs and data caching determinations and makes effective reuse of cached data for indexed data scanning.

Some database processing applications include database architectures that try to maximize reuse of partial query results from the query down to the page access level. These architectures achieve this by detecting overlaps in active query plan operators at query execution time and then exploit it by pipelining one operator's results to all dependent operators where possible. Two operators that are able to incorporate this architecture are table scan and index scan operators. For these operators, one scan thread executes that keeps scanning all pages while table scan operators can attach to and detach from this thread in order to share the scanned pages. While this approach works well for scans with similar speeds, in practice scan speeds can vary by large margins and even single scans' speeds are usually far from constant due to changes in predicate evaluation overhead. Therefore, the benefit can be lower as scans may start drifting apart. Techniques to prevent drift by automatically throttling faster scans and by scan-group based prioritization of buffer pages are generally applicable for table scans only. In addition to cache or page buffer algorithm improvements, other methods to reduce disk access costs for multiple concurrent queries with overlapping data accesses have been investigated. These methods include multi-query optimization (which requires all queries to be known in advance) and query result caching. Due to being at a high level of the query execution hierarchy, the latter may miss out on sharing potential for queries that have very different predicates but still end up performing scans on the same table, for example. Smarter buffer managers may be used to optimize page replacement under multiple running queries in order to maximize buffer locality. Such approaches require significant modifications of the caching system.

Therefore a need exists to overcome the problems with the prior art as discussed above.

SUMMARY OF THE INVENTION

In accordance with one aspect of the present invention, a method for performing concurrent scans of stored data based upon an index data structure for the stored data includes performing a first scan of stored data where the first scan sequentially scans through an index data structure indexing the stored data and accessing the stored data in a sequence defined by the index structure and where each entry of the index structure indicating a respective record in the stored data. The method further includes maintaining, over a duration of the first scan, a first scan current scan location within the index data structure, the first scan current scan location indicating a currently accessed record within the stored data structure for the first scan. The method also includes accepting a request for a second scan of the stored data that specifies a second start key and a second end key within the index data structure. The method further includes determining, during the performing the first scan, a starting index scan location within the index data structure for the second scan, the staring index scan location being sufficiently near the first scan current index scan location to cause a respective record entry indicated by the starting index scan location to be stored within a buffer due to the performing the first scan. The method also includes starting the second scan at the starting index scan location and proceeding to the second end key. The method also includes providing results of the first scan and the second scan.

In accordance with another aspect of the present invention, an index scan processor to perform concurrent scans of stored indexed data includes an indexed data scanner that performs a first scan of stored data, the first scan sequentially scanning through an index data structure indexing the stored data and accessing the stored data in a sequence defined by the index structure where each entry of the index structure indicates a respective record in the stored data. The indexed data scanner also maintains, over a duration of the first scan, a first scan current scan location within the index data structure, the first scan current scan location indicating a currently accessed record within the stored data structure for the first scan. The index scan processor also includes a scan manager that accepts a request for a second scan of the stored data, the second scan specifying a second start key and a second end key within the index data structure. The scan manager also determines, during the first scan, a starting index scan location within the index data structure for the second scan, the staring index scan location being sufficiently near the first scan current index scan location to cause a respective record entry indicated by the starting index scan location to be stored within a buffer due to the performing the first scan. The scan manager also starts the second scan at the starting index scan location and proceeding to the second end key. The index scan processor further has an output adapted to providing results of the first scan and the second scan.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
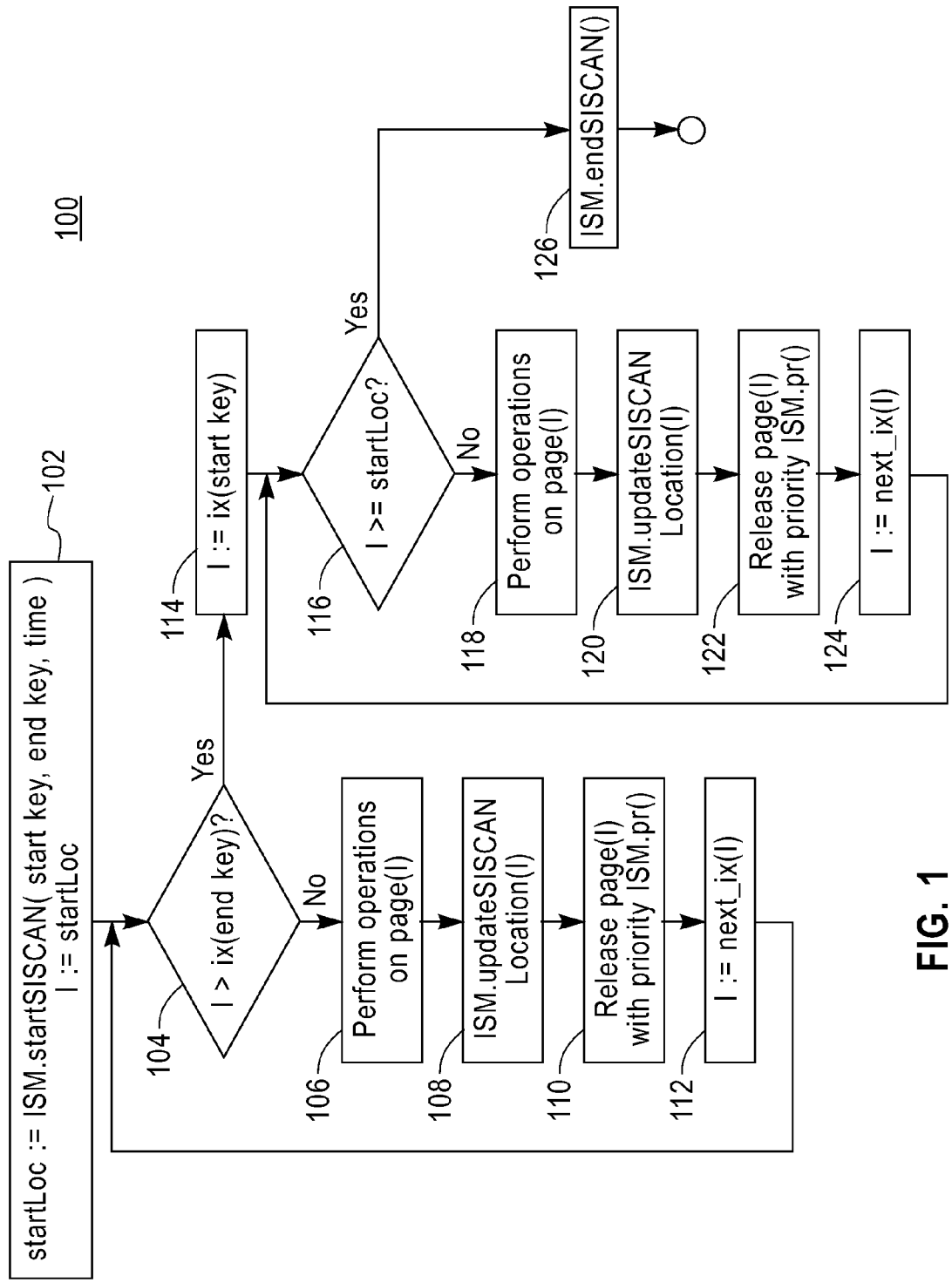
FIG. 1 illustrates a SISCAN operation processing flow, in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward.

Index Scan Overview

An access plan consists of a number of operators, used to satisfy a given query, as determined by the optimizer. The operators represent processing steps such as table scans, joins, predicate evaluations, etc. One such operator is IXSCAN, or index scan. An IXSCAN includes various attributes, such as which index to scan, whether there are predicates to apply, etc.

A standard index scan consists of reading leaf pages from an index, processing each entry (i.e., a key and a row identifier, or RID) sequentially, and (possibly) following each RID to retrieve the corresponding record from the underlying table. There may be a start key and/or an end key to limit the scope of the scan, depending on predicates in the SQL query.

An example of a conventional index scan process is able to include a specification of a start key. The start key, if provided, is used in a tree search that starts with the root of the index to find the child page of each non-leaf page that may contain the key value specified. This tree search is continued until such a child is a leaf page, and that child leaf page is used as the starting page of the scan. If there is no start key, the index scan begins at the first leaf page in the index. Once the starting page has been determined, the scan begins with a loop over the leaf pages and a loop over each entry. The page corresponding to the RID of each leaf page is read into a buffer or may be already loaded into the buffer due to a prior access. The record specified by that RID is located and is then handled in whatever way is needed for the query processing, e.g., predicates, aggregations, sorting, etc.

Pages being processed by the scan operation are retrieved from a data storage and stored in a temporary buffer, such as a cache memory or a database bufferpool. Once the processing of a conventional index scan operation reads and processes the relevant parts of a table page associated with an index entry, that page is released from the buffer so that the space can be used for other pages, if needed. In releasing the page, the page is able to be marked with an indicator, such as a priority value, that indicates a relative order in which pages stored in the buffer should be overwritten. One example of an indicator is a priority assigned to the released page. The priority assigned to the released page is an indicator to the caching algorithm to affect the order in which pages to first discard, i.e., which pages to actually overwrite with new data, when space is needed. In conventional index scan processes, the priority of released pages is typically fixed during a scan. One embodiment of the present invention is alternatively able to adjust the priority of released pages according to various criteria, as is discussed below, so that pages that are likely to be reprocessed by other operations are more likely to be retained in the buffer. Once the page is released from the buffer, the next iteration of the loop finds the next Record Identifier (RID) in the index entry, if any. If the index scan specifies an end key, each entry encountered in the loop is compared against that the end key value to determine if the scan is complete. If there is no end key, the scan ends with the last entry in the last leaf page.

Index Scan Location

At any time during an index scan, it is said to have a particular "location". The term "location" in this description indicates which key, i.e., entry in the index being used for the index scan, and Record Identifier (RID) that is currently being processed by the scan operation. Whenever the index scan moves "forward," the next RID of the same key value is accessed until no more are available. Then, the scan proceeds to process the next key value (in either increasing or decreasing order) and the first RID for that key.

The operation of an index scan process differs from a table scan process in several significant ways. In contrast to the index scan process described above, where index keys are used to access data in an order different than the order in which the data is stored in a table, the current scan location of a table scan is described simply as the current RID. The next location to be used by the table scan is obtained by simply increasing or decreasing the RID. In the case of an index scan, the next location is described by RIDs in each index entry, and then by proceeding through the index entries to determine the subsequent pages to process. This is an important distinction because in an index scan, only the key values are in increasing or decreasing, the RIDs may not be in any specific order. Access to the stored data in an index scan can lead to many expensive disk seek operations if the RIDs are poorly distributed across the scan range of an index scan. One embodiment of the present invention provides data caching processing that is able to mitigate this problem.

Concurrent Index Scans

Often, there will be multiple applications performing the same index scan at the same time. There may or may not be overlap in the ranges of values covered by the concurrent scans. The scans may have the same values for start and end keys, or the start and end key ranges may overlap in some way, or they may be disjoint.

If there is overlap in the ranges specified for start and end keys, then the scans may benefit each other in terms of buffer usage. In the case of multiple index scans accessing a common range of an index, the first index scan to read a particular page pays the price of the physical I/O. If a second index scan over the same range of the index can process that page while it is already in the buffer pool, a second physical read is able to be avoided. In a case where the second index scan starts after some time has passed, there is a chance that the buffer manager has already overwritten that page and the second index scan will have to do a physical read again. In this second case, both scanners will have to do physical reads of the same sequence of pages, resulting in roughly twice the number of physical reads as would be the case if the second index scan could access the data read during the first index scan while that data is still in the buffer. In other words, if the scan locations are processing index keys that are close to one another, the number of physical page reads needed is able to be reduced.

Sharing Index Scan Operator (SISCAN)

One embodiment of the present invention introduces a new index scan operator, identified herein as "SISCAN" (for "sharing index scan"). This operator, as provided by one embodiment of the present invention, is able to be inserted at most places of a query plan where, for example, a conventional IXSCAN operator would be applicable. The new index scan operation of one embodiment of the present invention enables the corresponding index scans to actively share buffer contents with other ongoing index scans that are using the same portion of an index.

In a conventional query plan, the IXSCAN operator may be associated with a start and/or end key specifying the range of an index to be scanned. The IXSCAN operator then traverses the corresponding index structure at runtime starting from the start key and ending with the last identifier matching the end key.

The SISCAN operator of one embodiment of the present invention also results in traversing the index structure and accessing every record between the specified start and end key. The SISCAN operator, however, is able to perform a modified traversal algorithm to improve the likelihood of sharing data pages already retrieved into a buffer by other SISCAN operations. The SISCAN operator of one embodiment performs the traversal of an index as follows:

1. pick a start location startLoc (i.e., key and RID)
2. scan index from startLoc to end key
3. scan index from start key to startLoc By allowing the SISCAN to start at any location in step 1 above, one embodiment of the present invention allows buffer page sharing to be improved by starting a subsequent index scan that is associated with another SISCAN operation at or near the current location of an ongoing SISCAN operation. If these two index scan operations have a similar speed, they will subsequently read the same index entries and thereby the same base table pages, even if the index structure of the stored data lists RIDs that are "randomly" distributed across the scan range.

One embodiment of the present invention includes a SISCAN operator that has additional parameters for controlling various aspects of buffer sharing. Examples of some of these parameters are a scan speed estimate and a scan amount estimate. The scan speed estimate characterizes the index scan's speed in, for example, a number of pages read per second. The scan amount estimate characterizes the overall number of pages to be read between start key and end key. These parameters are supplied in one embodiment by a costing component of the query compiler and can be based on table statistics and/or past measurements.

Implementation of one embodiment of the present invention uses piecewise scans of the specified range of an index. The implementation of piecewise scans is not difficult in many implementations because most RDBMSs, for example, already provide similar facilities for farming out scans to multiple processors. Also, the breaking of an index scan by one embodiment of the present invention into only two phases rather than some other more complex scan pattern reduces both implementation complexity and the required memory footprint for scan status information.

SISCAN Operators in Query Plans

In one example of a query plan optimizer's processing of a particular query plan, the query optimizer may choose an index scan operation over some other access type if the cost caused by the index scan is lower than the cost caused by the other access types. This may be due to, for example, selectivity or due to sorted results needed later in the query plan, making an index scan desirable.

An Example of SISCAN Process Logic

In one embodiment of the present invention, a SISCAN is able to be implemented as multiple IXSCANs. As a simplified example, one SISCAN operation is conceptually similar to performing two regular IXSCANs. Examples of differences between an IXSCAN and a SISCAN is that (1) a SISCAN can start in the middle of its key range, and (2) the SISCAN periodically calls a new component, the index scan sharing manager (ISM). The ISM of one embodiment is a component of a shared buffer memory controller and is discussed in depth below. For the purposes of the current description, it suffices to understand that the ISM keeps track of ongoing SISCAN operations and influences index scan speeds and buffer replacement decisions based on information concerning current SISCAN operations.

SISCAN operations of one embodiment interact with the ISM in several ways. For example, each SISCAN operation of one embodiment of the present invention first registers with the ISM and provides its start key, its end key, and an expected time needed to finish the scan. The ISM, based on information obtained from other concurrently executing SISCAN operations, then determines whether the new SISCAN should start at the first key/RID of its scan range or whether it can join some other ongoing SISCAN. We will discuss the determination of an optimal starting index for newly commenced index scan operations, as is implemented by one embodiment, in detail below.

The operations performed for each index entry by the SISCAN index scan are similar to the processing of index entries by an IXSCAN except that SISCAN operations on one embodiment periodically call the ISM process to provide an update of their scan location within the index. In various embodiments of the present invention, a call by the SISCAN operation to the ISM process to provide an update of the scan location for that SISCAN operation is able to be performed, for example, at every page of the stored data that is processed, the update is able to be performed at some period, for example a time period or a number of pages read period, or the update is able to be performed in any periodic or aperiodic manner. One embodiment of the present invention allows more accurate location information to be available in the ISM at a cost of additional processing overhead.

A page of stored data that has been accessed according to a currently processed index is then released from the buffer. Contrary to the processing of an IXSCAN process, one embodiment of the present invention implements a SISCAN operation with an ISM process that also dynamically adjusts the priority of the page of stored data that was released from the buffer. The ISM processing of one embodiment sets a priority of the page that is released from the buffer based on the state of all currently executing SISCAN operations. The ISM process of one embodiment is able to adjust two parameters in conjunction with a SISCAN operation, picking the starting location of the scan and setting the priority of pages that are released from the buffer. One embodiment of the present invention includes an ISM process that chooses the priority of pages released from the buffer such that pages that will be soon needed by other SISCAN operations receive a higher priority than pages that are not expected to be needed by other SISCAN operations. A process by which the ISM of one embodiment chooses a priority to assign to released pages is described below.

A first phase of a SISCAN operation involves scanning the index from the "startLoc" index, as described above, to the end of the index range specified for the SISCAN. After completing that first phase, a second index scan is performed starting at the original start key of the SISCAN command and ending at the "startLoc" key. After this second index scan completes, the SISCAN of one embodiment informs the ISM that the index scan has ended. When reaching this point, all index entries starting at the start key and ending at the end key have been read and processed. Conceptually, one can think of the SISCAN logic of one embodiment of the present invention as two back-to-back IXSCANs over adjacent key ranges.

FIG. 1 illustrates a SISCAN operation processing flow 100, in accordance with one embodiment of the present invention. The SISCAN operation of one embodiment of the present invention starts scanning a specified index in a manner similar to an IXSCAN but instead of starting from the start key, it starts from the location "startLoc" that is assigned to it by the ISM (200). The SISCAN operation of one embodiment begins by determining, at step 102, the starting location of a first phase of the index scan. In one embodiment, the ISM provides an interface through a "startSISCAN" function that accepts the scan parameters and returns the starting location to be used by that particular SISCAN operation. The processing further sets the current index entry to be processed, represented as "I," equal to the startLoc value returned by the start SISCAN function of the ISM process.

The processing proceeds to determine, at step 104, if the current index entry is greater than the end key specified for the current scan operation, which is returned by the function ix(end key). Since the scan has just started, this is not likely to be the case so the processing proceeds to performing, at step 106, the specified operations on the data page indicated by the current index entry "I." The processing of one embodiment of the present invention continues by providing an update, at step 108, of its current processing location to the ISM process. Further embodiments of the present invention are able to provide this update at some fraction of iterations of this processing loop.

The processing continues by releasing, at step 110, the currently processed data page, the data page that is indicated by the currently processed index entry. One embodiment of the present invention sets the priority of the released data page according to an estimation of likelihood that another SISCAN operation will be accessing that data page. The processing then increments, at step 112, the index entry to currently process to the next index entry. The processing then returns to determining, at step 104, if the current index entry to process is greater than the index entry at the end of the specified scan range.

If the current index entry to process is determined, at step 104, to be greater than the end key for the specified scan range, the first phase of the scan has reached the end of the scan range. As described above, it is likely that the first phase of the SISCAN operation started in the middle of the index range that is required to be scanned. The processing then returns to perform the second phase of the SISCAN operation by scanning over the first part of the specified index scan range. The processing proceeds to implement this second phase of the SISCAN operation by setting, at step 114, the current index entry to the index entry specified as the start of the SISCAN operation. The processing then continues to determine, at step 116, if the current index location is at or beyond the specified startLoc determined for the SISCAN operation. If the current index is at or beyond the startLoc, the second phase of the SISCAN is complete and the ISM is notified by a call, at step 126, to the endSISCAN function of the ISM process.

If the current index is not at or beyond the startLoc, the processing continues by performing, at step 118, operations on the data page specified by the current index entry. The processing continues by updating, at step 120, the current location of the SISCAN operation with the ISM by the update SISCAN function of the ISM process. The processing releases, at step 122, the data page from the buffer, with a specification of a priority that indicates the order in which the data page is to be overwritten in the buffer. The current index entry is then incremented and the processing returns to determining, at step 116, if the current index is at or beyond the startLoc. The processing then continues as described above.

Index Scan Sharing Manager (ISM)

The index scan sharing manager (ISM) process of one embodiment of the present invention maintains information of ongoing index scans. An example of information maintained by an ISM process of one embodiment of the present invention includes the location within the index range of each SISCAN operation, and the respective speed of each SISCAN operation. The ISM process of one embodiment is able to maintain this information with very little overhead in terms of memory and CPU usage. The ISM process of one embodiment also determines start locations of a new SISCAN operations and is able to perform scan speed regulation and buffer entry reprioritization based on the characteristics of ongoing SISCAN operations with the goal of maximizing buffer reuse by multiple SISCAN operations.

Architectural Context of an ISM Process

Figure 2:
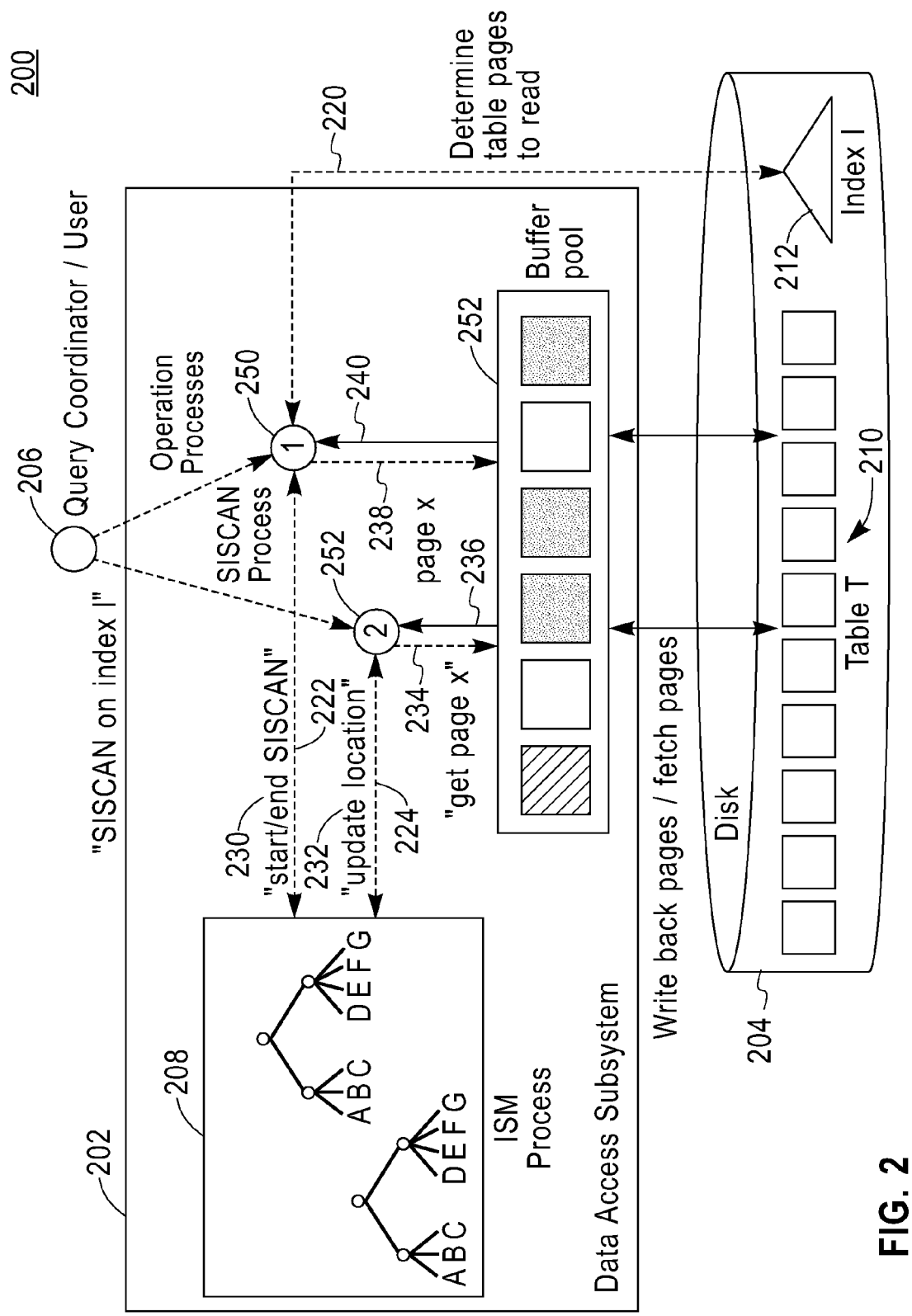
FIG. 2 illustrates a SISCAN operation data exchange architecture, in accordance with one embodiment of the present invention.

FIG. 2 illustrates a SISCAN operation data exchange architecture 200, in accordance with one embodiment of the present invention. During the execution of a query with index scans, new SISCAN operations of one embodiment are received at a data access subsystem 202 from a query coordinator or a user 206. These new SISCAN operations are then spawned as individual processes, such as SISCAN operation process 1 250 and SISCAN operation process 2 252. Two SISCAN processes are illustrated herein to illustrate the functions of one embodiment of the present invention and to simplify this description. Any practical number of SISCAN operations is able to be supported by one embodiment of the present invention.

Each spawned SISCAN operation of one embodiment is in communications with the ISM process 208 through a SISCAN-ISM interface, such as SISCAN-ISM interface 1 220 and SISCAN-ISM interface 2 224. The SISCAN-ISM interface is able to provide, for example, an indication of a start or end of a SISCAN operation 230 to the ISM process 208. The individual SISCAN operations then determine which table pages to scan via index access based upon data read from index 1212 through data index interface 220. The required pages are then fetched from the buffer 252 by appropriate data read commands such as the "get page x" commands 234 and 238. If the requested page is not already in buffer 252, the data is retrieved from disk 204 by reading table T 210.

The executing SISCAN operations 250 and 252, periodically provide information to the ISM process 208 indicating the current index location being processed by that SISCAN operation 250 and 252, such as by an "update location" function call over the SISCAN-ISM interfaces 230 and 232. The SISCAN operation finally informs the ISM process when that SISCAN operation is complete, such as by a endSISCAN function call over the SISCAN-ISM interface 230 and 232.

The above operational architecture of one embodiment of the present invention allows interfaces for the ISM process to be kept relatively simple. In one embodiment, the ISM process is only required to have interfaces for accepting a "start/end of SISCAN" and an "update location" from the SISCAN operations. The above operational architecture also allows the ISM to be kept separate from the rest of the architecture. In one embodiment, there is no direct interaction between the ISM process and buffer replacement algorithms or index access functions. Only the SISCAN processes of one embodiment interact with the ISM process, allowing the implementation of changes to the architecture to be made by changes only localized processing components.

Attributes Maintained by ISM

ISM Processes maintain information that is used to determine how to establish a partial ordering between concurrently executing SISCAN operations. This partial ordering of SISCAN operations supports, for example, determinations of where to start new SISCAN operations within the index and how to control the speed of the concurrently executing SISCAN operations.

One embodiment of the present invention maintains one ISM process per data storage buffer since index scans usually do not span multiple data storage buffers. Each ISM process maintains statistics about the ongoing SISCAN operations. For each SISCAN operation, the ISM process maintains the location of each SISCAN operation (e.g., by maintaining a record of the currently processed key value and RID), the remaining pages in the scan range for each SISCAN operation. As described above, the remaining pages in a scan range for each SISCAN operation is initialized from a scan amount estimate provided by the SISCAN operator, an average scan speed (specified in, for example, pages/second). In one embodiment, the average scan speed is initialized as "(estimated pages in scan range)/(estimated scan time)" and updated during scan execution. The ISM process further stores the start and end key of the scan range of each operating SISCAN, an anchor location and an anchor offset for each operating SISCAN. The ISM process of one embodiment updates these attributes whenever a SISCAN operation starts, finishes, or updates its location.

Partial SISCAN Location Order

In contrast to direct table scans, it is generally difficult to determine distances between index scans by only inspecting their scan locations because the RIDs of index scans are not necessarily accessed in any monotonic order. The distance between index scans is therefore not simply a difference between the scan locations of two SISCAN operations. However, increasing buffer sharing and making adjustments to the index scan speed to increase buffer sharing is facilitated by estimating the distance between two index scans within an index. In order to determine the distance within the index between concurrently executing SISCAN operations using the same index, the ISM of one embodiment performs processing to determine and maintain information describing the distance of a SISCAN operation within the index to a, known location within the index that is able to be common with the multiple concurrently executing SISCAN operations. In one embodiment of the present invention, this location is referred to as the "anchor location."

Whenever a new SISCAN operation, referred to herein as "SISCAN A," of one embodiment of the present invention starts, it is able to start at a location in the index that is not related to other SISCAN operations or it is able to start at a location within the index that is a location that is currently being processed by a second SISCAN operation, which is referred to herein as "SISCAN B." When SISCAN A starts at a location that is unrelated to other SISCAN operations, the ISM process of one embodiment sets the current anchor for SISCAN A to the starting location for SISCAN A. The anchor distance is then set to 0. When SISCAN A is started at a location that is currently being processed by the second SISCAN operation, i.e., SISCAN B, the ISM process of one embodiment of the present invention sets SISCAN A's anchor to the location of SISCAN B's anchor and SISCAN A's anchor offset equal to the value of SISCAN B's offset. Whenever SISCAN A or SISCAN B move, their anchor offset is updated with the moving distance, but the anchor value, which points to a an index entry that was processed by both SISCAN operations, remains the same. Based upon the distance of SISCAN A and the distance of SISCAN B from the anchor, which are respectively stored in the SISCAN A offset and the SISCAN B offset, the ISM process is able to calculate the distance between the currently processed index entries of SISCAN A and SISCAN B.

It should be noted that the maintenance of anchor locations and offsets as described above for one embodiment of the present invention is performed while regarding the index as a black box with no access to internal data of or dependency upon the implementation of the index function of the data storage system. No changes are necessary in the way the index is managed and in fact, the same anchor/offset technique works for any type of index that has a deterministic ordering.

Figure 3:
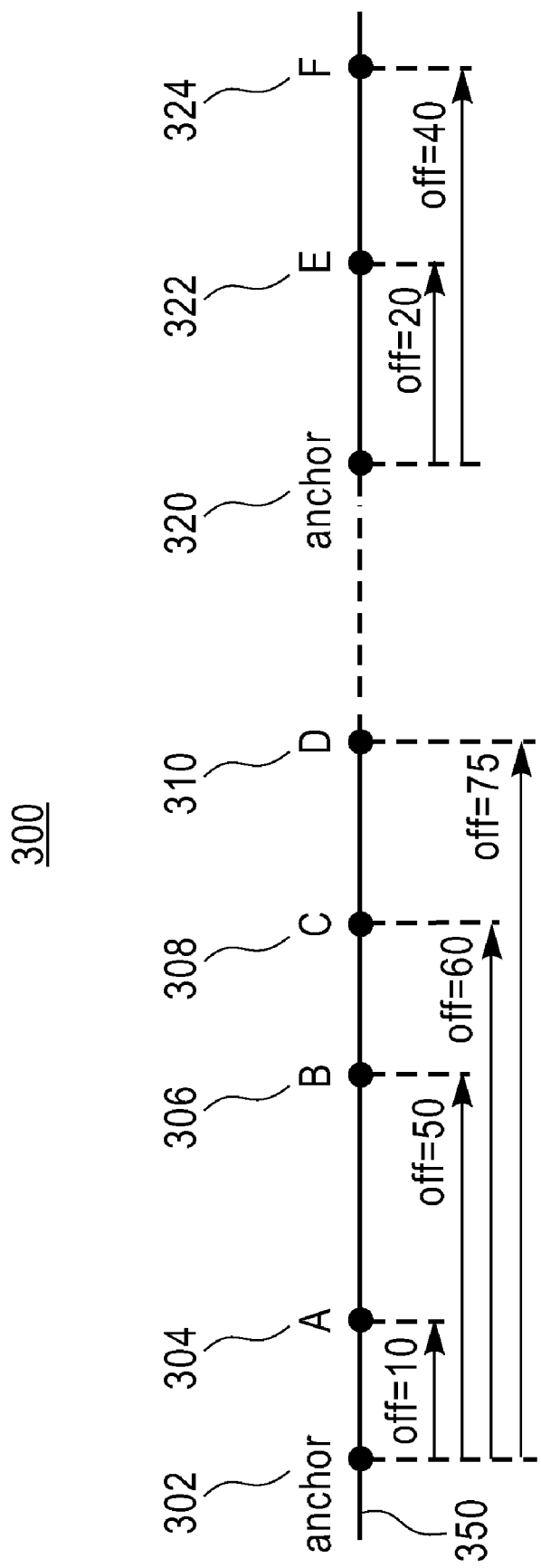
FIG. 3 illustrates index entry distances 300 as determined by an ISM process, in accordance with one embodiment of the present invention.

FIG. 3 illustrates index entry distances 300 as determined by an ISM process, in accordance with one embodiment of the present invention. As illustrated by the index entry distances, it is useful to think of the anchors and anchor offset values as a basis for defining a partial ordering between the index entries being processed by different SISCAN operations. The illustrated index entry distances 300 shows two anchors, a first anchor 302 and a second anchor 320, and six concurrently executing SISCAN operations, a first SISCAN operation 304, a second SISCAN operation 306, a third SISCAN operation 308, a fourth SISCAN operation 310, a fifth SISCAN operation 322 and a sixth SISCAN operation 324. Four of the illustrated SISCAN operations, the first SISCAN operation 304, the second SISCAN operation 306, the third SISCAN operation 308 and the fourth SISCAN operation 310 are shown to have the first anchor 302 in common with each other by having the distances between those current scan locations and the first anchor 302 defined. The other two SISCAN operations, the fifth SISCAN operation 322 and the sixth SISCAN operation 324 are shown to have the other anchor, the second anchor 320, in common by having the distances between the current location of those scans and the second anchor 320 defined.

SISCAN operations that have anchors in common are referred to herein as anchor groups. In one embodiment of the present invention, the relative locations between the currently processed index entries of index scans within anchor groups are able to be determined by comparing their anchor offsets. The relative locations between currently processed index entries of index scans that are in the same anchor group, however, are not able to be determined. Since the relative locations of index scans of SISCAN operations that are not in the same anchor group is not able to be determined, we obtain a partial ordering between SISCAN operations as AØB, BØC, CØD, EØF where "Ø" denotes the (transitive) partial order defined by anchors and offsets.

SISCAN Initial Placement

One embodiment of the present invention utilizes SISCAN operations that start by calling a startSISCAN function of the ISM process. The ISM process, in response to the invocation of the startSISCAN function then determines where the new SISCAN should start by inspecting its scan statistics data structure. If there are no other concurrently executing SISCAN operations, the ISM process is able start the new SISCAN operation at the start key/RID specified by that SISCAN operation. If there are some other ongoing SISCAN operations, the ISM process then determines a starting location for the scan associated with the new SISCAN based on the speeds, locations, and scan ranges of other concurrently executing SISCAN operations. One embodiment of the present invention operates to maximize buffer sharing between all SISCAN operations by selecting the starting location of each scan associated with each SISCAN based on the available statistics.

If, for example, there is one ongoing scan A with scan range [key "a", key "f"] and its current location is at key "b" and the scan range of a new scan B is [key "d", key "g"], B cannot share buffer pages by starting at A's location because key "b" is outside of B's scan range.

Even when ruling out cases where the current location of ongoing scans is outside of the scan range of the new scan, there may be many other currently executing SISCAN operations that can be selected as the starting location for a new SISCAN operation. The starting location of a new SISCAN operation depends on (1) the speeds, and (2) the remaining scan ranges of the currently executing SISCAN operations. We also note that in order to find the optimal starting location for a new SISCAN operation, it is not enough to consider ongoing SISCAN operations individually. In many cases, a new scan may first share buffer pages with one ongoing scan and then switch to share buffer pages with another scan due to speed changes of and drift between the different currently executing SISCAN operations. An algorithm to find the optimal placement of one embodiment therefore also considers starting locations that do not lead to immediate sharing if such a starting location is able to lead to more buffer page sharing between currently executing SISCAN operations later on.

Estimating Sharing Potential

Each starting location of a new SISCAN has a different sharing potential of buffer memory pages with other currently executing SISCAN operations based on those other currently executing SISCAN operations.

Figure 5:
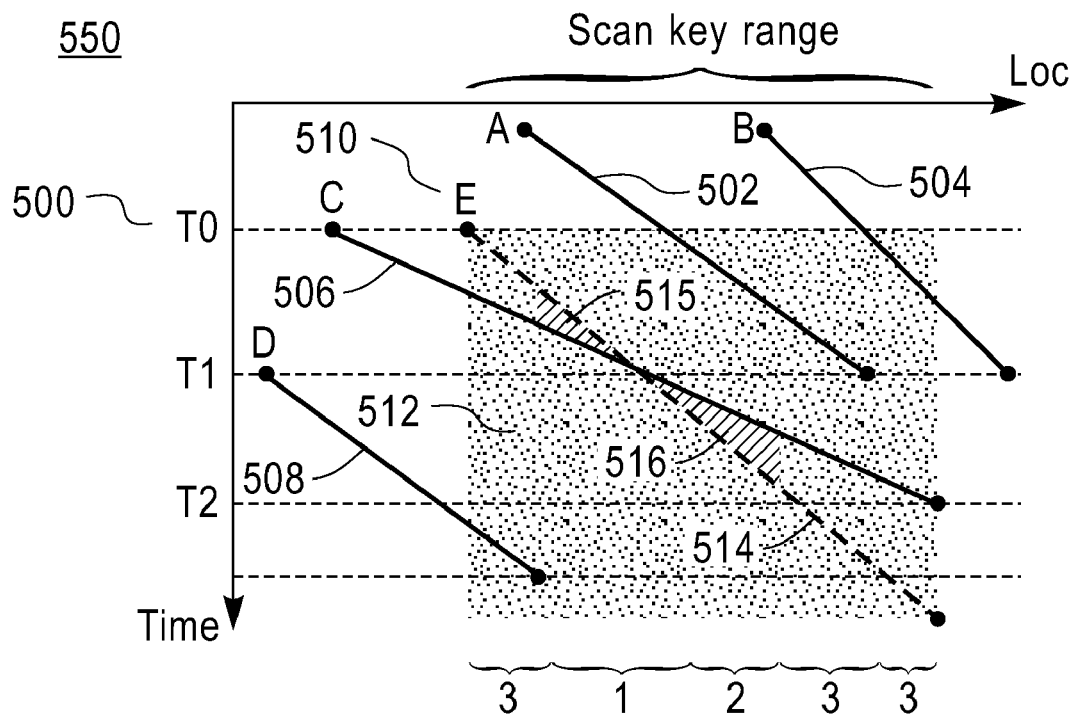
FIG. 5 illustrates a buffer page sharing estimation, in accordance with one embodiment of the present invention.

FIG. 5 illustrates a buffer page sharing estimation 550, in accordance with one embodiment of the present invention. The buffer page sharing estimation 550 includes an x-axis that represents the location of the index scans within the index and the y-axis represents time increasing towards the bottom of the figure. Current time is illustrated as the top-most dashed line T0 500. There are three ongoing SISCAN operations illustrated for the buffer page sharing estimation 550, SISCAN A 502, SISCAN B 504, and SISCAN C 506 that each have different scan ranges and speeds. The buffer page sharing estimation 550 further includes a future SISCAN operation, SISCAN D 508. The future SISCAN operation, SISCAN D 508, is able to be, for example, an implementation of a second phase of SISCAN A 502 (assuming SISCAN A 502 was started in the middle of its specified index scan range and completing the SISCAN A 502 includes performing a second phase as discussed above), or SISCAN D 508 is able to be a scan that is the inner of a nested loop join and therefore repeated multiple times.

In an example of a start of a new SISCAN operation, which is indicated as SISCAN E 510, when the processing system is in the above described state. The scan range and expected scan time of the new SISCAN E 510 is shown as a dotted box 512 in the center. The width of the dotted box 512 corresponds to the range of SISCAN E 510 and the height of the dotted box 512 corresponds to the time estimated to perform SISCAN E 510.

As an example of determining an optimal starting location for SISCAN E 510, several candidate starting locations are considered. A first candidate starting location is at the beginning of the specified scan range for SISCAN E 510. The index scan performed as a result of this first candidate starting location corresponds to a trace as shown by the dotted line marked as Trace "E" 514. Between the current time T0 and time T1, there are four ongoing SISCAN operations (SISCAN A 502, SISCAN B 504, SISCAN C 506, and SISCAN E 510). Only SISCAN C 506 and SISCAN E 510 are close enough to share some buffer pages (as shown by the first hashed area 515 between "C" and "E"). However, sharing is only possible if SISCAN C 506 and SISCAN E 510 are close to each other since otherwise the operation of SISCAN A 502 and SISCAN B 504 could cause buffer pages to be displaced. Between time T1 and T2, only three scans (SISCAN C 506, SISCAN D 508, SISCAN E 510) are currently running, thereby allowing for sharing even when SISCAN C 506 and SISCAN E 510 are further apart (shown by the larger second hashed area 516 between T1 and T2). However, at some point, the distance between SISCAN C 506 and SISCAN E 510 will be too large due drift caused by their different speeds, and sharing will end.

The potential for concurrent SISCAN operations to share buffered data in the above scenario can now be calculated by counting how often stored data pages for SISCAN E 510 range are read and re-read. In the key range before SISCAN C 506 and SISCAN E 510 start sharing data indicated by common index entries, there are three scans that read those pages at different times, SISCAN C 506, SISCAN D 508, and SISCAN E 510, which can result in each page in this range being read three times. The second key range is when only SISCAN C 506 and SISCAN E 510 are active and sharing, so each page here is read only once. In the next range, SISCAN A 502 is active in addition, so each page is read twice. Then SISCAN C 506 and SISCAN E 510 stop sharing, so each page is now read three times. In the last key range, SISCAN B 504, SISCAN C 506, and SISCAN E 510 are active but none is sharing, so each page is read three times. If for example, the sizes of the ranges are 15, 30, 15, 20, and 10 pages respectively, then the overall amount of page reads in the dotted box 512 would be 15*3+30*1+15*2+20*3+10*3=195. This compares to the worst case without sharing which is 15*3+30*2+30*3+5*3+10*3=240. So, the potential reduction in data reading I/O through the sharing allows by one embodiment of the present invention is 19%.

Figure 6:
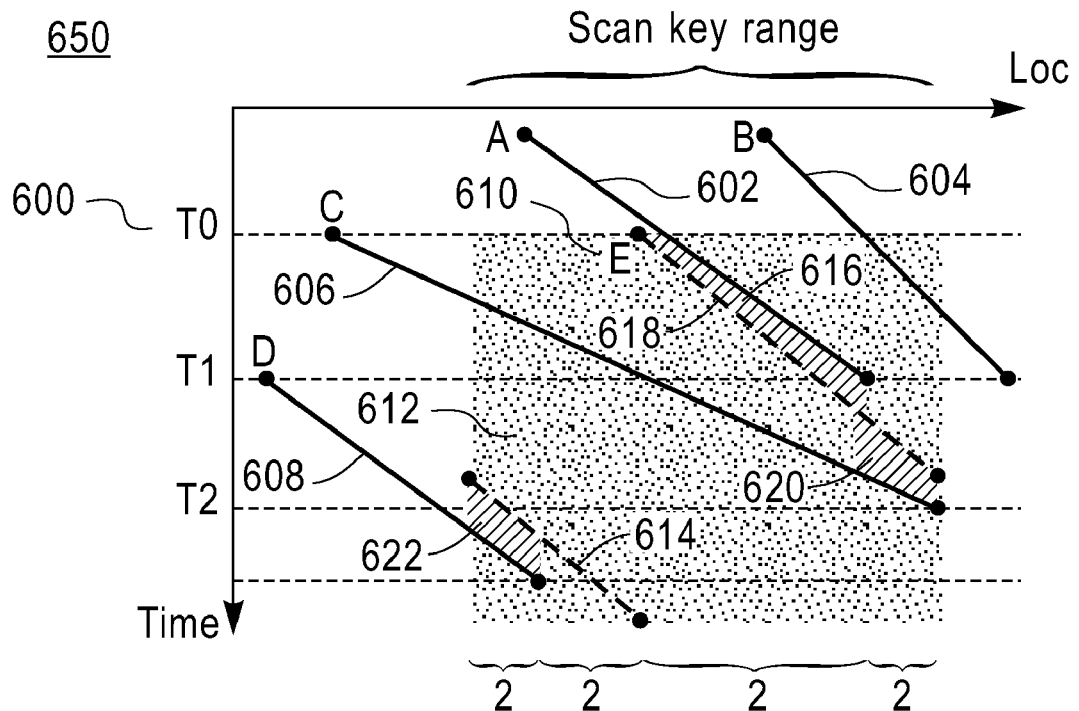
FIG. 6 illustrates an alternative index scan starting point processing, in accordance with one embodiment of the present invention.

FIG. 6 illustrates an alternative index scan starting point processing 650, in accordance with one embodiment of the present invention. In the case of the alternative index scan starting point processing 650, SISCAN E 610 is started at an index entry that is near the index entry currently being processed by SISCAN A 602. SISCAN E 610 then scans until it reaches the right end of the scan range, and then the processing "wraps around" and starts a second scan phase 614 from the left end of the index scan range for SISCAN E 610. The alternative index scan starting point processing 600 shows two dotted lines corresponding to SISCAN E, a first scan phase 618 and a second scan phase 614. In this scenario, SISCAN E 610 is able to share data retrieved into the data storage buffer by SISCAN A 602 from the beginning of its processing until SISCAN A ends, i.e., within a first shaded area 616, due to an assumption that both of these SISCAN operations have similar speeds and therefore stay close together in index entries to be processed. After SISCAN E 610 shares data that had been retrieved by SISCAN A 602, SISCAN E 610 then shares pages with SISCAN C 606 until the end of the scan range for SISCAN E 610, i.e., within the second shaded area 620, is reached. Finally, after starting in the second scan phase 614, SISCAN E 610 is able to share data retrieved into the data storage buffer by SISCAN D 608 until SISCAN D ends, as is reflected by a third shaded area 622.

A data sharing potential is able to be calculated for the alternative index scan starting point processing 600 in a manner similar to that as used above. In the first key range, in which SISCAN D 608 and SISCAN E 610 are sharing data in a data buffer and SISCAN C 606 is not, each page is read twice. In the second range where SISCAN C 606 and SISCAN D 608 are ongoing but not sharing data in a buffer, each page is read twice. In the third range, where SISCAN A 602 and SISCAN E 610 are sharing data in a buffer but SISCAN C 606 is not, each page is again read twice. In the last range, where SISCAN C 606 and SISCAN E 610 are sharing data in a buffer but SISCAN B 604 is not, each page is also read twice. In an example where these respective ranges have index entry sizes of 15, 20, 40, and 15, we have 15*2+20*2+40*2+15*2=180 page reads. The potential I/O reduction is therefore 25%. In the case of the above two example, starting SISCAN E 610 near SISCAN A 602 is therefore the preferred choice.

Figure 7:
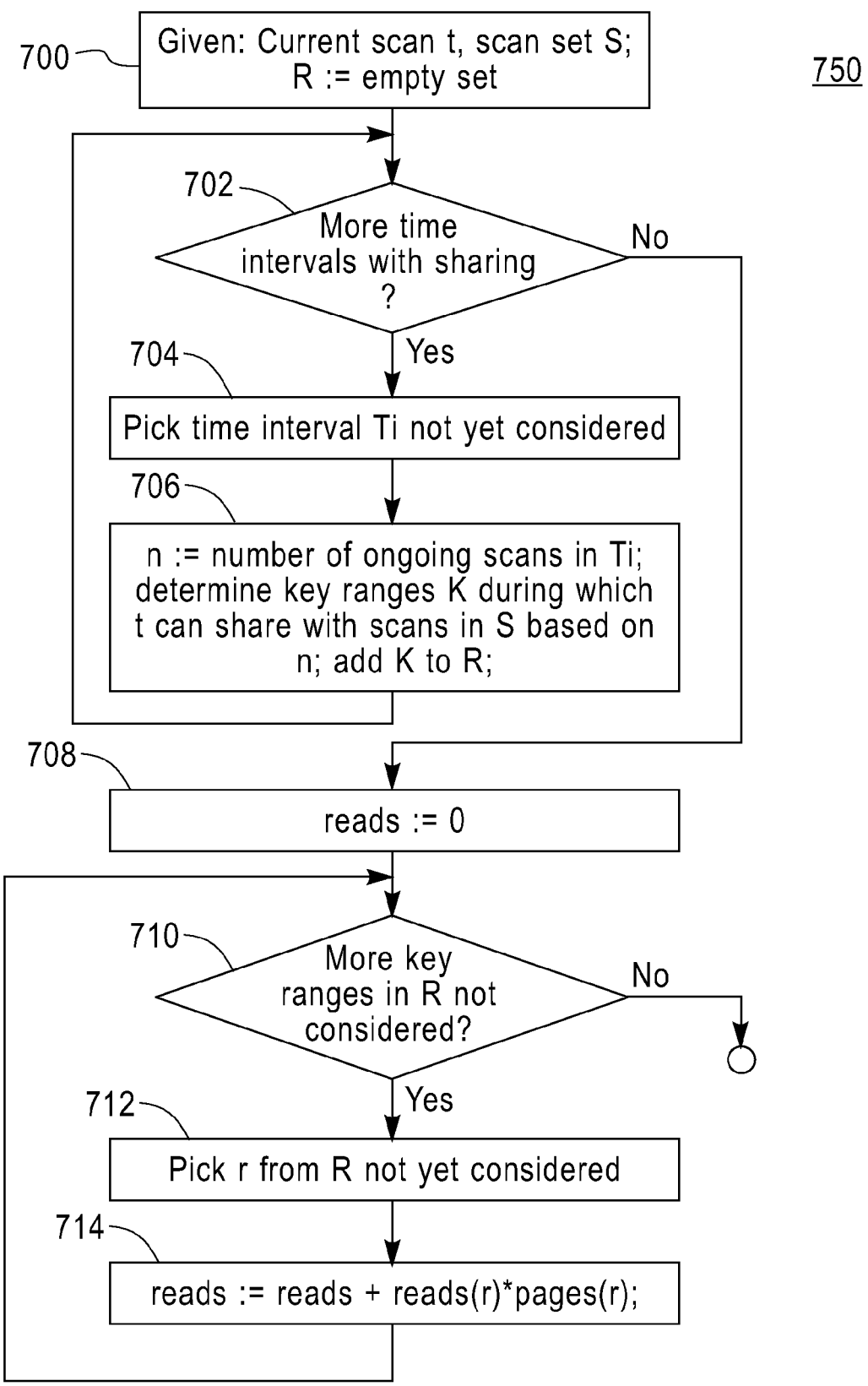
FIG. 7 illustrates an SISCAN page read number estimation algorithm, in accordance with one embodiment of the present invention.

FIG. 7 illustrates an SISCAN page read number estimation algorithm 750, in accordance with one embodiment of the present invention. The SISCAN page read number estimation algorithm 750 estimates a number of pages that are required to be read into a memory buffer, assuming improved reuse of data pages that are already resident in the buffer, given a start location and a given set of concurrent SISCAN operations. The SISCAN page read number estimation algorithm 750 first segments the overall key range into adjacent key ranges that share the same concurrent scans, at steps 702, 704, and 706. The processing continues by determining, for each such key range, the number of I/O reads that are to be performed, at steps 708, 710, 712, and 714. The function "reads(r)" illustrated for the SISCAN page read number estimation algorithm 750 in step 714 determines the number of reads and re-reads for any page in the range r and the function pages(r) determines the number of pages in range r. The end result of this calculation is the overall number of reads for the specified placement of the different concurrent SISCAN operations. Since the number of time intervals is proportional to the number of ongoing SISCAN operations and the number of key ranges in R is proportional to the number of SISCAN operations as well, the running time of this function is on the order of S, which is represented as O(|S|), where "S" represents the set of scan operations.

Finding the Best Starting Location

One manner in which to determine an optimal starting location is to try every possible starting location within the specified scan ranges for all concurrently executing SISCAN operations and selecting the staring locations with maximum sharing potential calculated using the previously described algorithm. Since the complexity of such an approach requires O(p|S|) steps where p is the number of pages in the scan range, this technique may require a significant amount of computing resources. An alternative manner in which to determine an optimal starting location, as is utilized by one embodiment of the present invention, utilizes one possible heuristic to provide this determination with lower computational costs and is based on the partial scan ordering defined above, which treats the index structure as a black box and relies on no specified structure of or access to the index structure of the underlying data management system.

Figure 8:
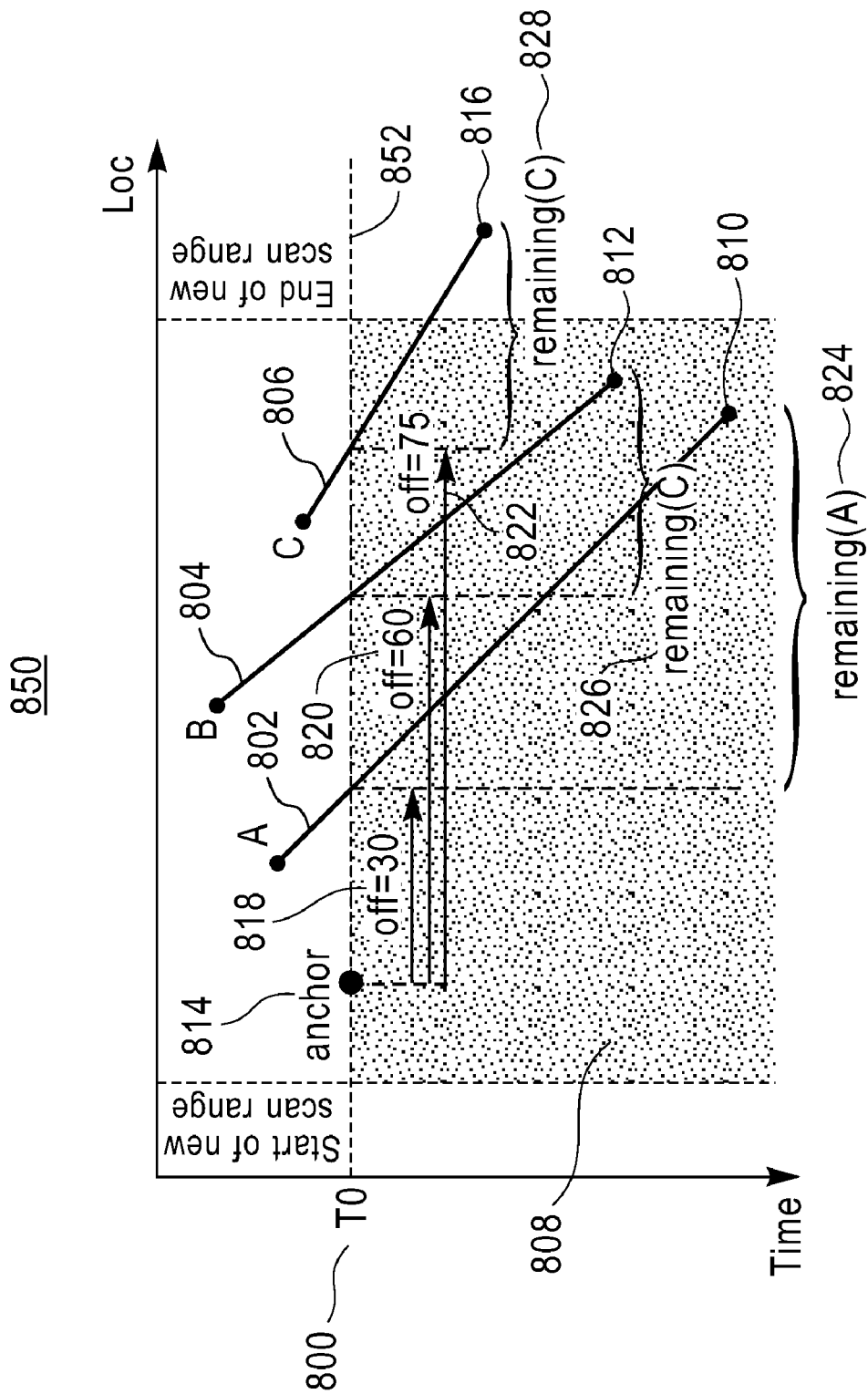
FIG. 8 illustrates a starting location determination scenario, in accordance with one embodiment of the present invention.

FIG. 8 illustrates a starting location determination scenario 850, in accordance with one embodiment of the present invention. The starting location determination scenario 850 illustrates an illustrative example with one anchor group of three SISCAN operations, indicated as SISCAN A 802, SISCAN B 804, and SISCAN C 806. The current time is again indicated as T0 852. In the starting location determination scenario 850, the current location of SISCAN A 802 current scan location, SISCAN B 804 current scan location, and the SISCAN C 806 current scan location are illustrated as the intersection of those traces with the dashed T0 line 852. These three current scan locations are illustrated as inside the new SISCAN operation's specified key range 808, which is shown as a shaded region. The SISCAN A end key 810 and the SISCAN B end key 812 and the anchor 814 are also within the new SISCAN operation's specified key range 808. SISCAN C's end key 816 is shown as outside of the new scan's range. Contrary to the previous algorithm, the ISM processing of one embodiment only has partial knowledge about the relative locations of the currently operating SISCAN operations and their end keys. The distance of SISCAN A's current location from the anchor 818, which is 30 in this example, the distance of SISCAN B's location from the anchor 820, which is 60 in this example, and the distance of SISCAN C's location from the anchor 822, which is 75 in this example, are available to the ISM process of one embodiment of the present invention. In addition, The ISM process of one embodiment of the present invention is able to determine the past (and assumed future) speed and the expected number of remaining pages of SISCAN A 824, SISCAN B 826, and SISCAN C 828, which are denoted in the figure as "remaining (A/B/C)". Scan speed and remaining scan pages are maintained for each SISCAN, as is described above, and provide the approximate end location of a scan relative to its start location.

As described above, the ISM process has nearly all of the parameters needed to apply the above described algorithm of FIG. 6 to this example. The ISM process maintains the current scan locations and the end locations of SISCAN A 802, SISCAN B 804, SISCAN C 806, along with their trace slopes. The ISM process further is able to determine an estimate of the new SISCAN operation's expected speed (from the average speed attribute) and the new SISCAN operation's end key location is fixed. The only parameter that is to be determined by one embodiment of the present invention is the new SISCAN operation's start location. There are three index entries that are clear candidates to pick from: the current location of SISCAN A, SISCAN B, and SISCAN C. One heuristic that is available is to calculate the sharing potential for data already retrieved into a buffer for each of these SISCAN operations. The SISCAN operation that is associated with the best calculated sharing potential is able to be used as an optimum starting location for this group of scans. The same procedure is then repeated for other anchor groups that overlap the new scan's key range. The ISM of one embodiment picks the starting location for the new SISCAN operation that has the best overall sharing potential among all groups.

Figure 9:
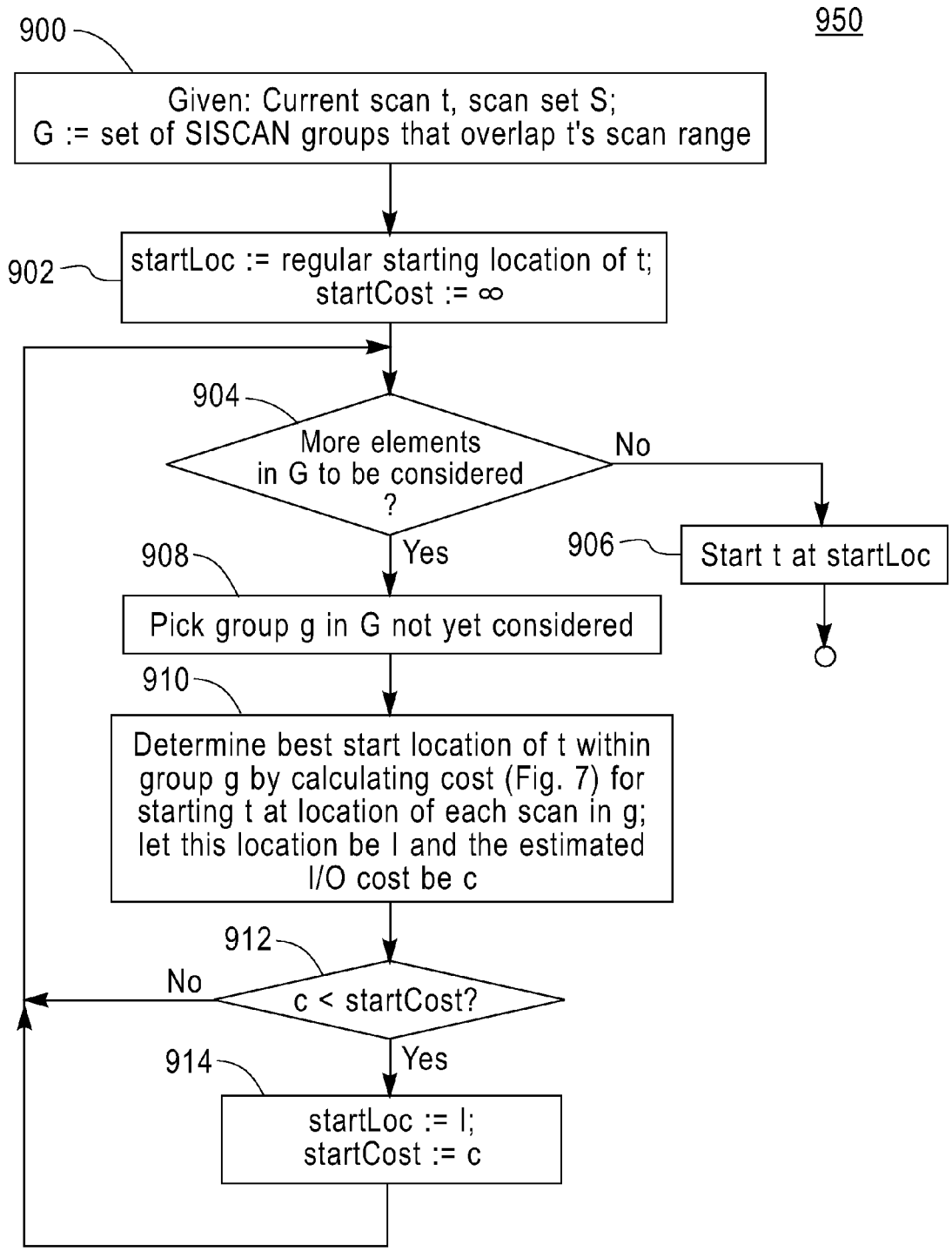
FIG. 9 illustrates a SISCAN starting location determination algorithm, in accordance with one embodiment of the present invention.

FIG. 9 illustrates a SISCAN starting location determination algorithm 950, in accordance with one embodiment of the present invention. The SISCAN starting location determination algorithm 950 initializes, at steps 900 and 902, and then iterates over each anchor group, at steps 904 through 914. For each group, the new SISCAN operation's optimal starting location in this group and the estimated cost due to buffer sharing is determined, at step 910. If the cost is better than the previously best cost found, as is determined at step 912, the best cost and start location are updated, at step 914. Once all groups have been inspected, the best start location is determined, at step 906. This algorithm evaluates the required I/O reads once per scan and therefore has an overall cost of O(|S|2).

Once a starting index entry location is determined for the new SISCAN operation, the anchor for the new SISCAN operation is set to either the start key/RID of the new SISCAN operation, if the new SISCAN operation cannot start within the index range of a currently executing SISCAN operation, or the anchor for the new SISCAN operation is set to an anchor of another currently executing SISCAN operation, if the new SISCAN operation starts at another SISCAN operation's location. The anchor offset for the new SISCAN operation is therefore set to either zero or to the anchor offset of the other SISCAN operation offset, respectively.

SISCAN Operation Attribute Updates

As discussed above, the ISM process of one embodiment has a software interface that is called periodically by the various SISCAN operations to provide updated SISCAN operation scan location in its data structures. This call is able to be performed every time a new table page is accessed or at some other periodic or non-periodic number of page accesses. There is a tradeoff: if the updates are too frequent, the ISM process maintains a more accurate accuracy of the SISCAN operation's scan location in the data structure but at the cost of extra processing overhead. On the other hand, if the updates are too infrequent, this overhead is lower but the location accuracy maintained by the ISM process decreases, leading to less optimal decisions for SISCAN operations start locations and speed control.

At every location update call to the ISM process of one embodiment of the present invention, the following SISCAN fields are modified: current scan location, remaining pages in the scan, scan speed, and anchor/offset information. In one embodiment, the scan speed is calculated as (pages read since last update)/(time since last update). Since this speed estimate depends only on the near past, it is able to capture speed fluctuations caused by interactions with other ongoing scans.

The anchor offset update is either simply incremented or is recalculated to accommodate a shift in the anchor's location as described above. For example, in a scenario where a first SISCAN operation has a new scan location that is equal to the anchor location entry location of a second SISCAN operation, the processing of one embodiment sets the anchor of the first SISCAN operation to the anchor location of the second SISCAN operation. In order to accommodate this shift in the anchor location of the first SISCAN, it's the anchor offset of the first SISCAN is set to (first SISCAN anchor offset)+ (second SISCAN anchor offset). This way, the anchor/offset-based partial maintenance of SISCAN operation order within the index, as discussed above, now includes ordering information for the first SISCAN operation and the second SISCAN operation. In other words, the first SISCAN and the second SISCAN are now in the same anchor-group.

SISCAN Operation Speed Control

Although a new SISCAN operation may be started in alignment with other SISCAN operations, SISCAN operations may start drifting apart over time. This is caused, for example, by different index scan predicates and the disk access interference. One embodiment of the present invention adjusts the speed of SISCAN operations to reduce SISCAN operation data access drift within the index over time and improve buffer data sharing among concurrently executing SISCAN operations.

One embodiment of the present invention groups concurrently executing SISCAN operations together based on similar speeds. The SISCAN operation in the front of a group (in scan direction through the index) is designated as the "leader" and the SISCAN operation in the back of the group, based on accessing index entries in the scan direction through the index, is designated as the "trailer" of the group. In order to reduce drift, one embodiment of the present invention periodically determines if the distance between the currently accessed index entries of leader and trailer becomes larger than some threshold. If it does, one embodiment of the present invention inserts wait operations into the execution of the leader to allow the trailer (and the rest of the SISCAN operations within the group) to catch up. The wait duration used by one embodiment of the present invention is determined by the measured speeds of the SISCAN operations in the group and the distance between leader and trailer.

An example of determining leaders and trailers in a scenario with the partial ordering information of SISCAN operations, as described above, is able to be based on the groups illustrated by the index entry distances 300 of FIG. 3 in a system that has, for example, a buffer size of 50 pages. As shown for the index entry distances 300 in this example, the partial order between the concurrently executing SISCAN operations of this example is AØB, BØC, CØD, and EØF. The distances between SISCAN operations, within the index, are d(A,B)=40, d(B,C)=10, d(C,D)=15, and d(E,F)=20.

The processing of one embodiment of the present invention initially sorts the pairs of SISCAN operations by their distances between one another and then adds them in increasing order to form larger scan groups until the sum of the extents of all scan groups reaches the buffer size. Here, we first add (B,C), then (C,D), resulting in the group (B,C,D), and finally we add (E,F) which does not merge with the other groups since no previously accessed index entries of these SISCAN operations are in common with the other SISCAN operations. The final result are the groups (A) with extent 0, (B,C,D) with extent 25, and (E,F) with extent 20 and an overall extent of 45 (which is smaller than the bufferpool size). For each of these groups we have a leader (the largest by location) and a trailer (the smallest by location). A is leader and trailer of the first group, B is trailer and D is leader of the second group, and E is trailer and F is leader of the third group. Now, if for example the distance between D and B becomes large, D is delayed until the distance falls again below some threshold (and similarly for E and F). This way, the index entries accessed by the multiple SISCAN operations are kept close together so as to increase the data that each SISCAN operation accesses that is already stored in the buffer cache.

Slowing down a SISCAN operation, as is performed by one embodiment of the present invention improves the overall query response time even though such an action may seem counter-intuitive at first. If the leader was not slowed down in the above scenario, the distance between the leader and other SISCAN operations in the group would keep increasing until the distance is so large that data pages stored in the cache buffer can no longer be reused between them. Once that happens, every page that the leader has read will be re-read by the other SISCAN operations in the group—the I/O cost has therefore doubled. This additional I/O in return also affects the leader itself negatively since its I/O requests get delayed more due to a busier disk.

Adaptive Buffer Page Release Prioritization

As discussed above, each SISCAN operation of one embodiment of the present invention releases processed pages with a variable priority determined by the ISM process rather than with a fixed priority. The ISM process of one embodiment assigns a high priority to released pages in the buffer that are expected to be needed soon by members of the group. The ISM process of one embodiment also assigns a low priority to released pages that are not expected to be needed soon. One embodiment of the present invention uses the leader-trailer status (as discussed in the previous section) as a basis for the priority to assign to released pages. Pages that the leader SISCAN operation has finished processing are assigned a high priority because other SISCAN operations that will need to process the same page are following. Pages that the trailer SISCAN operation has finished processing are assigned a low priority because there often a larger gap until the next following SISCAN operation that requires that page and so the page would be discarded anyway at some point in time before the following SISCAN operation is ready to read it.

Automated Processor

Figure 4:
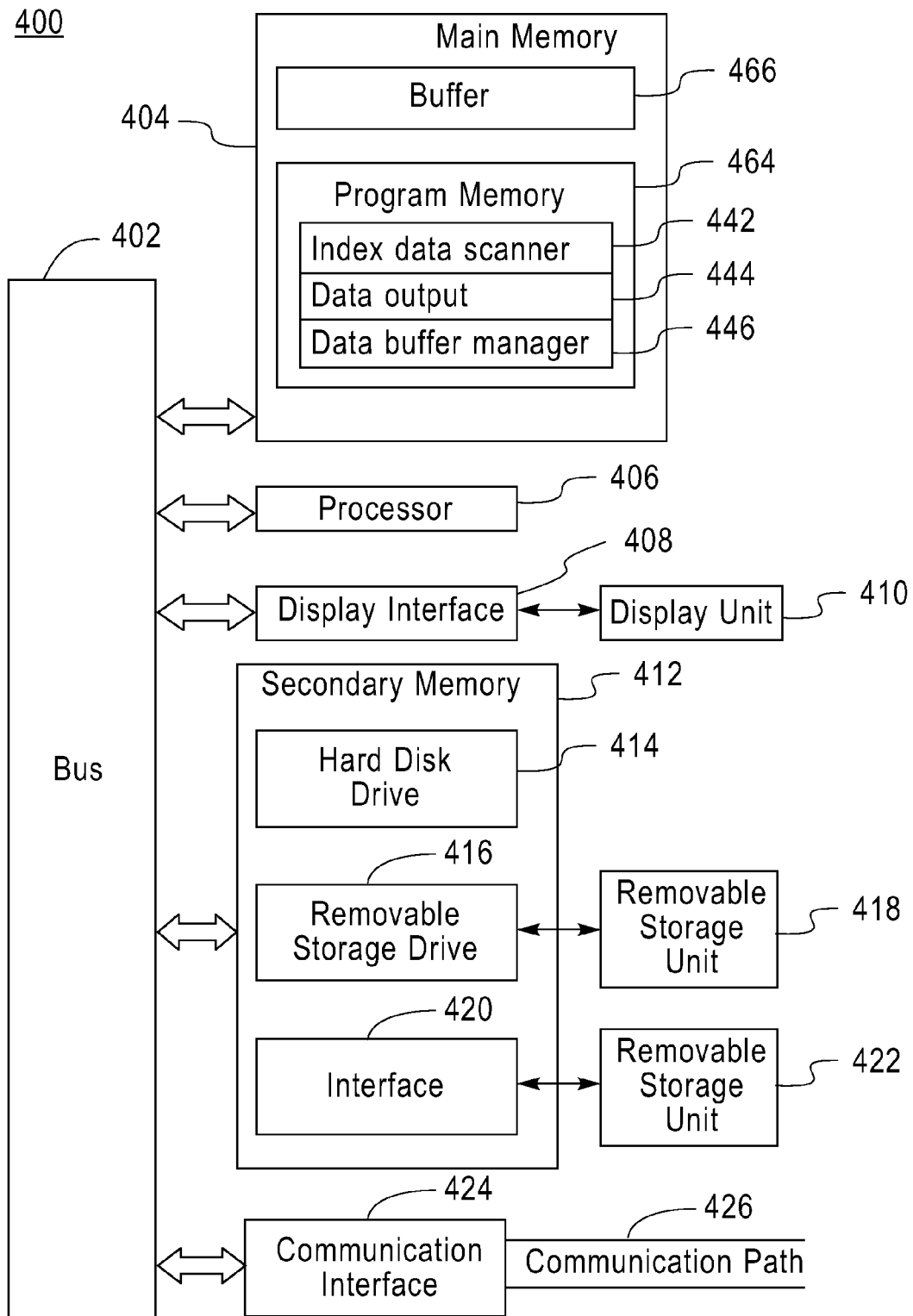
FIG. 4 is a block diagram of a computer system useful for implementing one embodiment of the present invention.

FIG. 4 is a block diagram of a computer system 400 useful for implementing an embodiment of the present invention. The computer system includes one or more processors, such as processor 406, that is able to be programmed to execute machine executable programs. The processor 406 is connected to a communication bus 402 (e.g., a computer backplane interface bus, cross-over bar, or data network). Various software embodiments are able to be realized through the use of the computer system 400. After reading this description, it will become apparent to a person of ordinary skill in the relevant art(s) how to implement the invention using other computer systems and/or computer architectures.

The computer system 400 also includes a main memory 404 that is used to store machine executable programs that are to be executed by processor 404 and to store data used by or produced by processor 404. Main memory 404 is able to include random access memory (RAM) to support reprogramming and flexible data storage.

Main memory 404 of one embodiment includes a buffer 466 that is used to temporarily store data for access by the processor 406. Main memory 404 further includes a program memory 464 that includes, for example, executable programs that implement the methods described herein. The program memory 464 includes, an indexed data scanner 442 that is adapted to performing a first scan of stored data by sequentially scanning through an index data structure indexing the stored data and accessing the stored data in a sequence defined by the index structure, where each entry of the index structure indicates a respective record in the stored data. The indexed data scanner also is adapted to maintaining, over a duration of the first scan, a first scan current scan location within the index data structure, the first scan current scan location indicating a currently accessed record within the stored data structure for the first scan. The data scanner of one embodiment is further adapted to continuing the second scan, subsequent to the starting the second scan and after the second scan reaches the second end index, at the second start index.

The program memory 464 also includes a scan manager that is adapted to accepting a request for a second scan of the stored data where the second scan specifies a second start index and a second end index within the index data structure. The scan manager further is adapted to determining, during the performing the first scan, a starting location index within the index data structure for the second scan where the staring location index is sufficiently near the first scan current index to cause a respective record entry indicated by the starting location index to be stored within a buffer due to the performing the first scan. The scan manager also is adapted to starting the second scan at the starting location and proceeding to the second end index. The scan manager of one embodiment is further adapted to selecting, from among the plurality of indexed data scans, the first scan based upon an overlap between of index ranges for scans within the plurality of indexed data scans and the second scan.

The program memory 464 further includes a data output module that is adapted to providing results of the first scan and the second scan.

The program memory 464 further includes a data buffer manager 446 that is adapted to storing a subset of the stored data that is less than all of the stored data in the buffer while performing the first scan, releasing, during the first scan, previously processed data that was stored in the buffer and that has been processed by the first scan, to indicate that the previously processed data is able to be overwritten, marking, in response to the releasing, the previously processed data as data to be retained in the buffer until after other released data is overwritten, wherein the other released data is not marked as data to be retained in the buffer until after other released data is overwritten, and overwriting, in response to the marking, the other data prior to overwriting the previously processed data.

One computer system 400 includes a display interface 408 that forwards graphics, text, and other data from the communication bus 402 (or from a frame buffer not shown) for display on the display unit 410. The computer system also includes a secondary memory 412. The secondary memory 412 may include, for example, a hard disk drive 414 and/or a removable storage drive 416, representing a floppy disk drive, a magnetic tape drive, an optical disk drive, etc. A removable storage drive 416 reads and writes to a removable storage unit 418, such as a floppy disk, magnetic tape, optical disk, etc., that stores computer software and/or data.

In alternative embodiments, the secondary memory 412 may include other similar mechanisms for allowing computer programs or other instructions to be loaded into the computer system. Such mechanisms may include, for example, a removable storage unit 422 adapted to exchange data through an interface 420. Examples of such mechanisms include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system.

The computer system 400 is also able to include a communications interface 424. Communications interface 424 acts as both an input and an output to allow software and data to be transferred between the computer system and external devices. Examples of a communications interface 424 include a modem, a network interface (such as an Ethernet card), a communications port, a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (i.e., channel) 426. This channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 404 and secondary memory 412, removable storage drive 416, a hard disk installed in hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 404 and/or secondary memory 412. Computer programs may also be received via communications interface 424. Such computer programs, when executed, enable the computer system to perform the features of the present invention as discussed herein. In particular, the computer programs, when executed, enable the processor 406 to perform the features of the computer system. Accordingly, such computer programs represent controllers of the computer system.

Alternative Embodiments

In this document, the terms "computer program medium," "computer usable medium," and "computer readable medium" are used to generally refer to media such as main memory 404 and secondary memory 412, removable storage drive 416, a hard disk installed in hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 404 and/or secondary memory 412. Computer programs may also be received via communications interface 424. Such computer programs, when executed, enable the computer system to perform the features of the present invention as discussed herein. In particular, the computer programs, when executed, enable the processor 406 to perform the features of the computer system. Accordingly, such computer programs represent controllers of the computer system.

As has now been described, embodiments of the present invention facilitate the maintenance of script libraries by presenting an inventive methodology of extracting common sub-procedures from an existing script library and employing the common sub-procedures in a semi-automated process for updating the script library when the application being tested undergoes changes to its GUI structure.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for performing concurrent scans of stored data based upon an index data structure for the stored data, the method comprising:

performing a first scan of stored data, the first scan sequentially scanning through an index data structure indexing the stored data and retrieving, into a buffer, records contained within the stored data in a sequence defined by the index structure, each entry of the index structure indicating a respective record in the stored data;

maintaining, over a duration of the first scan, a first scan current scan location within the index data structure, the first scan current scan location indicating a currently accessed record within the stored data structure for the first scan;

accepting a request for a second scan of the stored data, the second scan specifying a second start key and a second end key within the index data structure;

estimating, while performing the first scan, a sharing potential between the first scan and the second scan, the sharing potential indicating a likelihood that execution of the second scan accesses records contained within the buffer due to the performing the first scan;

determining, while performing the first scan and based on the sharing potential, a starting index scan location within the index data structure for the second scan, the staring location index scan location of the second scan being located relative to the first scan current scan location to cause the second scan to read records stored within the buffer due to the performing the first scan;

starting the second scan at the starting index scan location and proceeding to the second end key; and providing results of the first scan and the second scan.

2. The method of claim 1, further comprising
continuing the second scan, subsequent to the starting the second scan and after the second scan reaches the second end key, at the second start key.

3. The method of claim 1 further comprising:

storing a subset of the stored data that is less than all of the stored data in the buffer while performing the first scan;

releasing, during the first scan, previously processed data that was stored in the buffer and that has been processed by the first scan, to indicate that the previously processed data is able to be overwritten;

marking, in response to the releasing and based on a scan range of the second scan defined by the second start key and the second end key, a subset of the previously processed data as data to retain in the buffer until after other previously processed data is overwritten, wherein other previously processed data is not marked as data to retain in the buffer until after other released data is overwritten; and overwriting, in response to the marking, the other previously processed data prior to overwriting the subset of previously processed data.

4. The method of claim 1, further comprising:
concurrently performing a plurality of indexed data scans, the plurality of indexed data scans comprising the first scan; and
selecting, from among the plurality of indexed data scans, the first scan based upon an overlap of index entry ranges for index scans within the plurality of indexed data scans and the second scan.

5. The method of claim 4, further comprising:
associating a first anchor location for at least a first subset of the plurality of indexed data scans, the first anchor location indicating a first anchor location scan location within the index structure, the first anchor location having been encountered by each of the at least the first subset of the plurality of indexed data scans, wherein the at least the first subset of the plurality of indexed scans comprises the second scan;
maintaining, externally from the index structure and for each indexed scan within the plurality of indexed scans, a respective displacement count for each indexed scan of the at least the first subset of the plurality of indexed data scans, each respective displacement count indicating a respective number of indices processed after encountering the anchor location by respective indexed scans within the at least the first subset of the plurality of indexed scan; and
determining at least one distance between the second scan and each respective indexed data scan within the at least the subset of the plurality of indexed scans, the at least one respective distance comprising a difference between a displacement count for the second scan and respective distances for each respective indexed data scan within the at least the subset,
wherein the selecting is based at least in part on identifying the first data scan that corresponds to a minimum distance value.

6. The method of claim 5, further comprising:
associating, in response to the starting, the first anchor location with the second scan; and
maintaining, externally from the index structure and for each indexed scan within the plurality of indexed scans, a second scan displacement count, the second scan displacement count indicating a number of indices processed after encountering the anchor location by the second scan.

7. The method of claim 5, further comprising:
associating an additional anchor location for an additional subset of the plurality of indexed data scans, the additional subset of the plurality of indexed data scans not comprising the at least the subset of indexed data scans, the additional anchor location indicating an additional anchor location within the index structure, the additional anchor location having been encountered by each of the additional subset of the plurality of indexed data scans, wherein the at least the subset of the plurality of indexed scans comprises the second scan;
maintaining, externally from the index structure and for each indexed scan within the plurality of indexed scans, a respective additional displacement count for each indexed scan within the additional subset of the plurality of indexed data scans, each respective additional displacement count indicating a respective number of indices processed after encountering the additional anchor location by respective indexed scans within the additional subset of the plurality of indexed scan;
determining that one indexed scan within the at least the first subset of the plurality of indexed data scans has encountered the additional anchor location;
associating, in response to determining that the one indexed scan has encountered the additional anchor location, the additional anchor location with each indexed data scan within the at least the first subset of the plurality of indexed data scans; and
adjusting, in response to determining that the one indexed scan has encountered the additional anchor location and in response to the associating the additional anchor location with each indexed data scan within the at least the first subset of the plurality of indexed data scans, the at least one respective displacement count by a distance between the first anchor location and the additional anchor location as determined by a displacement count for the one indexed scan when the one indexed scan encountered the additional anchor location.

8. An index scan processor adapted to perform concurrent scans of stored data based upon an index data structure for the stored data, the index scan processor comprising:
an indexed data scanner, adapted to:
performing a first scan of stored data, the first scan sequentially scanning through an index data structure indexing the stored data and accessing the stored data in a sequence defined by the index structure, each entry of the index structure indicating a respective record in the stored data; and
maintaining, over a duration of the first scan, a first scan current scan location within the index data structure, the first scan current scan location indicating a currently accessed record within the stored data structure for the first scan;
a scan manager, adapted to:
accepting a request for a second scan of the stored data, the second scan specifying a second start key and a second end key within the index data structure;
determining, during the performing the first scan, a starting index scan location within the index data structure for the second scan, the staring index scan location being sufficiently near the first scan current index scan location to cause a respective record entry indicated by the starting index scan location to be stored within a buffer due to the performing the first scan;
starting the second scan at the starting index scan location and proceeding to the second end key; and
an output adapted to providing results of the first scan and the second scan.

9. The index scan processor of claim 8, wherein the indexed data scanner is further adapted to continuing the second scan, subsequent to the starting the second scan and after the second scan reaches the second end key, at the second start key.

10. The index scan processor of claim 8 further comprising a data buffer manager, the data buffer manager adapted to:
storing a subset of the stored data that is less than all of the stored data in the buffer while performing the first scan;
releasing, during the first scan, previously processed data that was stored in the buffer and that has been processed by the first scan, to indicate that the previously processed data is able to be overwritten;
marking, in response to the releasing and based on a scan range of the second scan defined by the second start key and the second end key, a subset of the previously processed data as data to retain in the buffer until after other previously processed data is overwritten, wherein other previously processed data is not marked as data to retain in the buffer until after other released data is overwritten; and overwriting, in response to the marking, the other previously processed data prior to overwriting the subset of previously processed data.

11. The index scan processor of claim 8:

wherein the indexed data scanner is adapted to concurrently performing a plurality of indexed data scans, the plurality of indexed data scans comprising the first scan; and wherein the scan manager is further adapted to selecting, from among the plurality of indexed data scans, the first scan based upon an overlap of index entry ranges for scans within the plurality of indexed data scans and the second scan.

12. The index scan processor of claim 11, wherein the scan manager is further adapted to:

associating a first anchor location for at least a first subset of the plurality of indexed data scans, the first anchor location indicating a first anchor location within the index structure, the first anchor location having been encountered by each of the at least the first subset of the plurality of indexed data scans, wherein the at least the first subset of the plurality of indexed scans comprises the second scan;

maintaining, externally from the index structure and for each indexed scan within the plurality of indexed scans, a respective displacement count for each indexed scan of the at least the first subset of the plurality of indexed data scans, each respective displacement count indicating a respective number of indices processed after encountering the anchor location by respective indexed scans within the at least the first subset of the plurality of indexed scan; and determining at least one distance between the second scan and each respective indexed data scan within the at least the subset of the plurality of indexed scans, the at least one respective distance comprising a difference between a displacement count for the second scan and respective distances for each respective indexed data scan within the at least the subset, wherein the selecting is based at least in part on identifying the first data scan that corresponds to a minimum distance value.

13. The index data scanner of claim 12, wherein the scan manager is further adapted to:

associating, in response to the starting, the first anchor location with the second scan; and maintaining, externally from the index structure and for each indexed scan within the plurality of indexed scans, a second scan displacement count, the second scan displacement count indicating a number of indices processed after encountering the anchor location by the second scan.

14. The index data scanner of claim 12, wherein the scan manager is further adapted to:

associating an additional anchor location for an additional subset of the plurality of indexed data scans, the additional subset of the plurality of indexed data scans not comprising the at least the subset of indexed data scans, the additional anchor location indicating an additional anchor location within the index structure, the additional anchor location having been encountered by each of the additional subset of the plurality of indexed data scans, wherein the at least the subset of the plurality of indexed scans comprises the second scan;

maintaining, externally from the index structure and for each indexed scan within the plurality of indexed scans, a respective additional displacement count for each indexed scan within the additional subset of the plurality of indexed data scans, each respective additional displacement count indicating a respective number of indices processed after encountering the additional anchor location by respective indexed scans within the additional subset of the plurality of indexed scan;

determining that one indexed scan within the at least the first subset of the plurality of indexed data scans has encountered the additional anchor location;

associating, in response to determining that the one indexed scan has encountered the additional anchor location, the additional anchor location with each indexed data scan within the at least the first subset of the plurality of indexed data scans; and adjusting, in response to determining that the one indexed scan has encountered the additional anchor location and in response to the associating the additional anchor location with each indexed data scan within the at least the first subset of the plurality of indexed data scans, the at least one respective displacement count by a distance between the first anchor location and the additional anchor location as determined by a displacement count for the one indexed scan when the one indexed scan encountered the additional anchor location.

15. A computer program product for performing concurrent scans of stored data based upon an index data structure for the stored data, the computer program product comprising:

a non-transitory storage medium readable by a processing circuit and storing instructions for execution by the processing circuit for performing a method comprising:

performing a first scan of stored data, the first scan sequentially scanning through an index data structure indexing the stored data and accessing the stored data in a sequence defined by the index structure, each entry of the index structure indicating a respective record in the stored data;

maintaining, over a duration of the first scan, a first scan current scan location within the index data structure, the first scan current scan location indicating a currently accessed record within the stored data structure for the first scan;

accepting a request for a second scan of the stored data, the second scan specifying a second start key and a second end key within the index data structure;

determining, during the performing the first scan, a starting index scan location within the index data structure for the second scan, the staring location index scan location being sufficiently near the first scan current index scan location to cause a respective record entry indicated by the starting index scan location to be stored within a buffer due to the performing the first scan;

starting the second scan at the starting index scan location and proceeding to the second end key;

continuing the second scan, subsequent to the starting the second scan and after the second scan reaches the second end key, at the second start key; and providing results of the first scan and the second scan.

16. The computer program product of claim 15, the method further comprising:

storing a subset of the stored data that is less than all of the stored data in the buffer while performing the first scan;

releasing, during the first scan, previously processed data that was stored in the buffer and that has been processed by the first scan, to indicate that the previously processed data is able to be overwritten, marking, in response to the releasing and based on a scan range of the second scan defined by the second start key and the second end key, a subset of the previously processed data as data to retain in the buffer until after other previously processed data is overwritten, wherein other previously processed data is not marked as data to retain in the buffer until after other released data is overwritten; and overwriting, in response to the marking, the other previously processed data prior to overwriting the subset of previously processed data.

17. The computer program product of claim 15, the method further comprising:

concurrently performing a plurality of indexed data scans, the plurality of indexed data scans comprising the first scan; and selecting, from among the plurality of indexed data scans, the first scan based upon an overlap of index entry ranges for index scans within the plurality of indexed data scans and the second scan.

18. The computer program product of claim 15, the method further comprising:

associating a first anchor location for at least a first subset of the plurality of indexed data scans, the first anchor location indicating a first anchor location scan location within the index structure, the first anchor location having been encountered by each of the at least the first subset of the plurality of indexed data scans, wherein the at least the first subset of the plurality of indexed scans comprises the second scan;

maintaining, externally from the index structure and for each indexed scan within the plurality of indexed scans, a respective displacement count for each indexed scan of the at least the first subset of the plurality of indexed data scans, each respective displacement count indicating a respective number of indices processed after encountering the anchor location by respective indexed scans within the at least the first subset of the plurality of indexed scan;

determining at least one distance between the second scan and each respective indexed data scan within the at least the subset of the plurality of indexed scans, the at least one respective distance comprising a difference between a displacement count for the second scan and respective distances for each respective indexed data scan within the at least the subset, wherein the selecting is based at least in part on identifying the first data scan that corresponds to a minimum distance value.

19. The computer program product of claim 18, the method further comprising:

associating, in response to the starting, the first anchor location with the second scan; and maintaining, externally from the index structure and for each indexed scan within the plurality of indexed scans, a second scan displacement count, the second scan displacement count indicating a number of indices processed after encountering the anchor location by the second scan.

20. The computer program product of claim 18, the method further comprising:

associating an additional anchor location for an additional subset of the plurality of indexed data scans, the additional subset of the plurality of indexed data scans not comprising the at least the subset of indexed data scans, the additional anchor location indicating an additional anchor location within the index structure, the additional anchor location having been encountered by each of the additional subset of the plurality of indexed data scans, wherein the at least the subset of the plurality of indexed scans comprises the second scan;

maintaining, externally from the index structure and for each indexed scan within the plurality of indexed scans, a respective additional displacement count for each indexed scan within the additional subset of the plurality of indexed data scans, each respective additional displacement count indicating a respective number of indices processed after encountering the additional anchor location by respective indexed scans within the additional subset of the plurality of indexed scan;

determining that one indexed scan within the at least the first subset of the plurality of indexed data scans has encountered the additional anchor location;

associating, in response to determining that the one indexed scan has encountered the additional anchor location, the additional anchor location with each indexed data scan within the at least the first subset of the plurality of indexed data scans; and adjusting, in response to determining that the one indexed scan has encountered the additional anchor location and in response to the associating the additional anchor location with each indexed data scan within the at least the first subset of the plurality of indexed data scans, the at least one respective displacement count by a distance between the first anchor location and the additional anchor location as determined by a displacement count for the one indexed scan when the one indexed scan encountered the additional anchor location.

* * * * *